United States Patent [19]

Fudemoto et al.

[11] 3,812,436

[45] May 21, 1974

[54] WAVEFORM EQUALIZER SYSTEM

[75] Inventors: Isao Fudemoto, Tokyo; Shiegeki Kubota, Yokohama; Tatsuki Hayashi, Kawasaki, all of Japan

[73] Assignee: Fiyitsu Limited, Kawasaki, Japan

[22] Filed: Dec. 29, 1972

[21] Appl. No.: 319,942

[30] Foreign Application Priority Data

Dec. 31, 1971 Japan .................................. 46-1844

[52] U.S. Cl. .................. 333/18, 328/144, 333/28 R

[51] Int. Cl. .............................................. H04b 3/04

[58] Field of Search ......... 333/18, 28 R; 179/170 R, 179/170.8

[56] References Cited

UNITED STATES PATENTS

| | | | |
|---|---|---|---|
| 3,011,135 | 11/1961 | Stump et al. | 333/18 X |
| 3,671,886 | 6/1972 | Fudemoto et al. | 333/18 |

*Primary Examiner*—Paul L. Gensler

*Attorney, Agent, or Firm*—Staas, Halsey & Gable

[57] ABSTRACT

A waveform equalizer system for pulse repeating transmission, including a transmission line and a repeater inserted therein. The repeater has such a gain characteristic that, with respect to a change in the transmission line length, a peak amplitude of a received signal is held constant and its waveform is changed within an allowable value restricted by intersymbol interference, thereby to provide an effective equalized waveform irrespective of the change in the transmission line length.

7 Claims, 9 Drawing Figures

WAVEFORM EQUALIZER SYSTEM

BACKGROUND OF THE INVENTION

1. Title of the Invention

This invention relates to a waveform equalizer system for used in a repeater which is inserted in a transmission line of a pulse repeating transmission system such as the PCM system.

2. Description of the Prior Art

One portion of a pulse repeating transmission line consists of repeaters 1 and 2 and a transmission line 3 as shown in FIG. 1. Each repeater is made up of an equalizing amplifier section EQ for compensating for line loss and for providing waveform equalization, and a waveform reproducing section RG supplied with the equalized waveform to produce a required waveform and applying it to the line 3. An output signal $S(t)$ from the repeater 1, take the form typically of a pulse train composed of many pulses whose levels are not alway two in number; but, for convenience of explanation, the following description will be given on the assumption that the transmission system is a binary one and that the signal pulse is binary, also. The pulse train derived from the repeater 1 is impressed to the line 3, in which the signal is distorted by the high frequency cutoff characteristic of the line and, as a result, its amplitude is attenuated and its waveform becomes distorted. The signal $S(t)$ is supplied to the repeater 2 in such a form as indicated by $g(t)$. If the signal $g(t)$ remains unchanged, waveform reproduction is impossible in the repeater 2, so that the line loss of the signal is compensated for and, at the same time, its waveform is shaped by the equalizing amplifier section EQ of the repeater 2 in a manner to avoid intersymbol interference. Dependant upon whether the shaped output is larger or smaller than a threshold value, the same waveform as the transmitted signal $S(t)$ is reproduced.

In such a repeating transmission line, it is a conventional design criterion that a received signal of constant amplitude and waveform is derived by the equalizing amplifier section EQ from the input signal $S(t)$ irrespective of dispersion in the line length. To perform this, the product $L(f)\cdot EQ(f)$ of the transfer function $L(f)$ of the line and that $EQ(f)$ of the equalizing amplifier section EQ of the repeater 2 is required to be constant at all times. Namely, with respect to such characteristics $L_1(f)$ and $L_2(f)$ of the frequency $f$ vs. line loss characteristic D($d$B) in the cases of the line being long and short as depicted in FIG. 2, the gain G characteristics of the equalizing amplifier section EQ must be such as indicated by $EQ_1(f)$ and $EQ_2(f)$ respectively as shown in FIG. 3. It is difficult to change the gain characteristic $EQ_1(f)$ to $EQ_2(f)$ for the purpose that a repeater having the equalizing amplifier EQ designed to be of the characteristic $EQ_1(f)$ is used in the case of the line being short. Namely, in order to lower the gain characteristic $EQ_1(f)$ down to $EQ_2(f)$, it is necessary to provide an equalizer for correction and, in this correction, there are some occasions when attenuation exceeding, for example, several tens of decibels is required and it is difficult in practice to achieve such a high degree of attenuation at high frequencies such as several hundred megahertzs.

The function of the equalizing amplifier in the pulse transmission system resides in that a transmitted signal subjected to attenuation distortion in the transmission line is thereby amplified and shaped in a form easy of discrimination by a discriminator circuit. Accordingly, if the amplitude of a received signal is constant corresponding to the output level of the transmitted signal, if its waveform lies within an allowable value restricted by the generation of intersymbol interference and if the waveform is easy of discrimination as described above, a little change in the waveform of the received signal does not matter.

SUMMARY OF THE INVENTION

The present invention has for its object to provide a waveform equalizer system with which it is possible to amplify and equalize a transmitted signal in a waveform easy of discrimination irrespective of a change in the length of the transmission line in which the transmitted signal is subject to attenuation distortion.

The waveform equalizer system of this invention is featured in that the repeater has such a gain characteristic to facilitate holding the peak amplitude constant irrespective of a change in the transmission line length but changing its waveform over a range of waveform interference being within an allowable value. Namely, the total transfer function is made variable, by which the aforesaid defects resulting from attenuation can be avoided.

BRIEF DESCRIPTION OF THE DRAWINGS

This invention will be more fully understood by the following description and attached drawings, in which.

DESCRIPTION OF THE PREFERRED EMBODIMENTS

Figure 1:
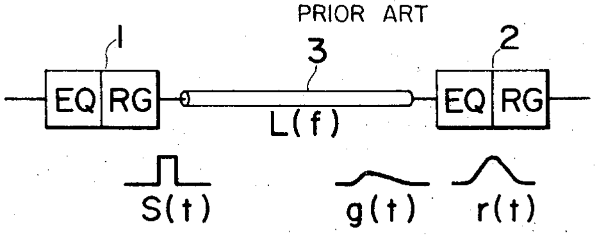
FIG. 1 PRIOR ART
FIG. 1 is a schematic diagram showing the construction of a conventional pulse repeating transmission system.
Figure 2:
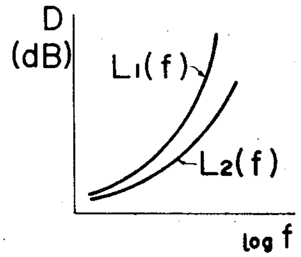
FIG. 2 is a graph showing the frequency characteristics of a line loss of the transmission line of FIG. 1.

Assume that a received signal is equalized, for example, in a Gaussian characteristic. Received signals $r(t)$ and $R(f)$ are given as follows:

$$R(f) = Ae^{-\tau^2 \pi^2 f^2} \quad (1)$$

$$r(t) \quad \alpha (A/K)\, e^{-(t/\tau^2)} \quad (2)$$

where $\tau = KT/2 \quad \sqrt{\log_e 2}$, $T$ being one time slot and $K$ a constant, and A and $\tau$ are numbers varying with a change in the line length and related to the width expressed as a ratio to one time slot at half value of peak level of signal, of the signal waveform.

If a transmitted signal is taken as S(*f*) and if the transfer functions of the line 3 and the equalizing amplifier section EQ are tanek as L(*f*) and EQ(*f*) respectively, the received signal R(*f*) is given in the following form:

$$R(f) = S(f) \cdot L(f) \cdot EQ(f) \quad (3)$$

therefore, it follows that $$EQ(f) = A \cdot [e^{-\tau^2 \pi^2 f^2} / S(f) \cdot L(f)] \quad (4)$$

Let it be assumed that the transmission line is of low frequency pass type having for example, such a loss characteristic that the loss increases with an increase in the frequency *f* as expressed by the following equation:

$$L(f) = e^{-B\sqrt{f} \cdot l}$$

where *B* is a constant and *l* the transmission line length. If S(*f*) = 1 corresponding to an impulse, the equation 4 becomes as follows:

$$EQ(f) = A \cdot e^{-\tau^2 \pi^2 f^2} \cdot e^{B\sqrt{f} \cdot l}$$

Considering from the viewpoint of the frequency band of an amplifier where $e^{-\tau^2\pi^2 f^2}$ representative of the Gaussian characteristic of the received signal is constant, the frequency band of equalizing amplifier greatly changes with a change in the transmission line length.

Figure 3:
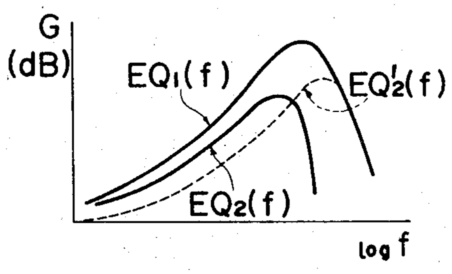
FIG. 3 is a graph showing the frequency characteristics of the gain of an equalizing amplifier.

This implies that the characteristic $EQ_1(f)$ becomes such a characteristic $EQ_2(f)$ as indicated by full line in FIG. 3. Since this is appreciably difficult to realize as described previously, substantial waveform equalization is achieved by replacing the solid line characteristic $EQ_2(f)$ with a characteristic $EQ'_2(f)$ indicated by broken line which is of the same band as the characteristic $EQ_1(f)$. Consequently, it is necessary to make the frequency bands of the characteristics $EQ_1(f)$ and $EQ_2(f)$ equal to each other by changing $e^{-\tau^2\pi^2 f^2}$ of the Gaussian characteristic corresponding to the line length.

$\tau$ is selected to make $e^{-\tau^2\pi^2 f^2} + B\sqrt{f}l$ constant with $f = 1.5f_o$ ($f_o$ being a repetitive frequency), that is, $$-\tau^2\pi^2[(3/2)f_o]^2 + B\sqrt{(3/2)f_o} l = c \quad (5)$$

$$\tau = \sqrt{B\sqrt{1.5f_o} l - c)} / 1.5\pi f_o \quad (6)$$

where *c* is a constant.

Therefore $$EQ(f) = A \cdot e^{cf^2/(3/2f_0)^2} \cdot e - \left[ \frac{\sqrt{1.5f_0}}{(1.5f_0)^2} f^2 - \sqrt{f} \right] \cdot Bl \quad (7)$$

If $\tau$ is changed with a change in the line length *l* by using the function of the equation 6, the band of the characteristic little changes and a received signal of a different pulse width is obtained because $\tau$ is related to the pulse width as described previously. A variable equalizing section of the type satisfying the equation 7 can be realized by a known method. If the characteristic EQ(*f*) is set to be of such a Gaussian characteristic within an allowable value resctricted by waveform interference with respect to a line of a desired maximum length, the received signal is equalized into a Gaussian intersymbol of narrow pulse width in the case of a shorter transmission line as will be apparent from the equation 6, so that intersymbol interference can be neglected. However, since the amplitude increases due to the spectrum difference in the Gaussian characteristic, this increase is controlled by the coefficient A.

Figure 4:
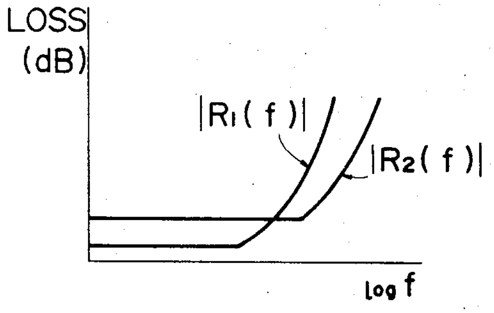
FIG. 4 is a graph showing waveform spectrums of a received waveform.
Figure 5:
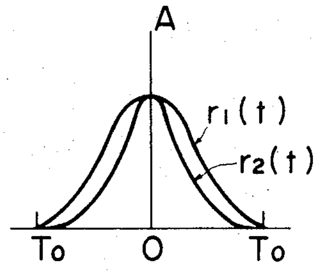
FIG. 5 is a received waveform diagram corresponding to FIG. 4.

FIG. 4 shows the spectrums of the received signal waveforms in the both cases and, in a received signal $r_2(t)$ in the case of the line length being small, a steady loss is increased such as $R_2(f) > R_1(f)$ more than that in a received signal $r_1(t)$ in the case of the line length being large. In such a case, the waveforms of the received signals $r_1(t)$ on the time domain become such as shown in FIG. 5. The pulse width of the received signal $r(t)$ and the flat amplitude control constant A are selected to bear a relationship such that $A = K(K\alpha \sqrt{B\sqrt{1.5f_o} l - c}/1.5\pi f_o)$ when normalized at 100 percent width (K = 1.0). Thus, it is possible to obtain a Gaussian received waveform whose maximum amplitude is constant but whose pulse width becomes narrow with a decrease in the transmission line length.

Figure 6:
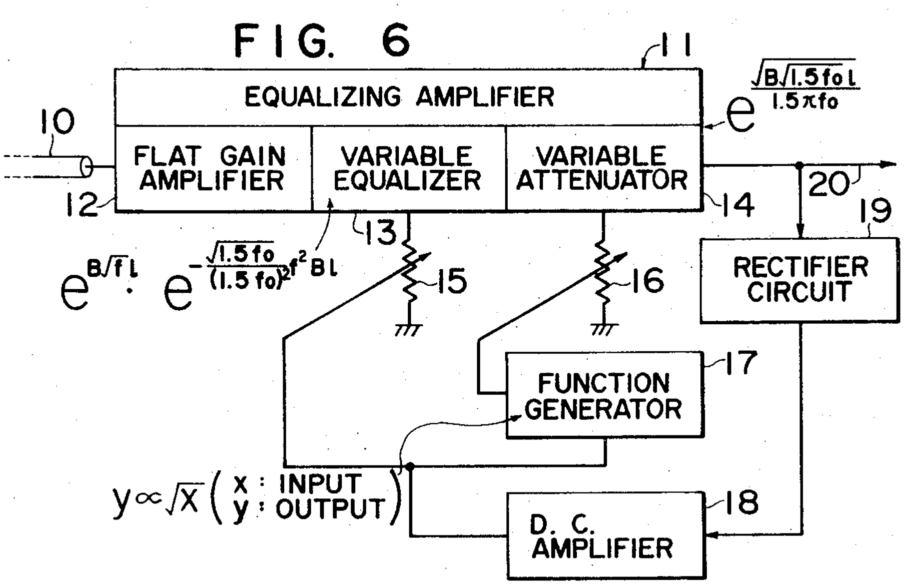
FIG. 6 is a block diagram illustrating the construction of an example of this invention.

FIG. 6 illustrates an equalizing amplifier 11 employing the waveform equalizer system of this invention. The peak value of an output signal or line 20 is detected by a rectifier circuit 19 and the gain of the equalizing amplifier 11 is controlled by the detected peak value through a DC amplifier 18 in such a manner that the characteristic EQ(*f*) may correspond to its relationship with the line length *l* as by the by equation 1.

The equalizing amplifier 11 comprises a flat gain amplifier 12, a variable equalizer 13 and a variable attenuator 14 as expressed by the equation 7.

A variable element 15 of the variable equalizer 13 is controlled with a voltage proportional to the transmission line length *l* which is obtained by the detection of the peak value of the received signal and a variable element 16 of the variable attenuator 14 is controlled by converting the voltage proportional to the line length *l* into a voltage proportional to $\sqrt{l}$ by means of a function generator 17.

The variable equalizer 13 has the following construction. If the lengths of a transmission line of a maximum length and a shorter line are taken as $l_1$ and $l_2$ respectively, the characteristic of the variable equalizer 13 with respect to the line length $l_2$ is as follows:

$$e\left(\sqrt{f} - \frac{\sqrt{1.5f_0}}{(1.5f_0)^2} f^2\right) Bl_2 \leqq e^B \sqrt{\left(\frac{l_2}{l_1}\right)^2 f} l_1 \cdot e \frac{\sqrt{1.5f_0}}{(1.5f_0)^2} \left(\sqrt{\frac{l_2}{l_1}} \cdot f\right)^2 Bl_1 \quad (9)$$

Figure 7:
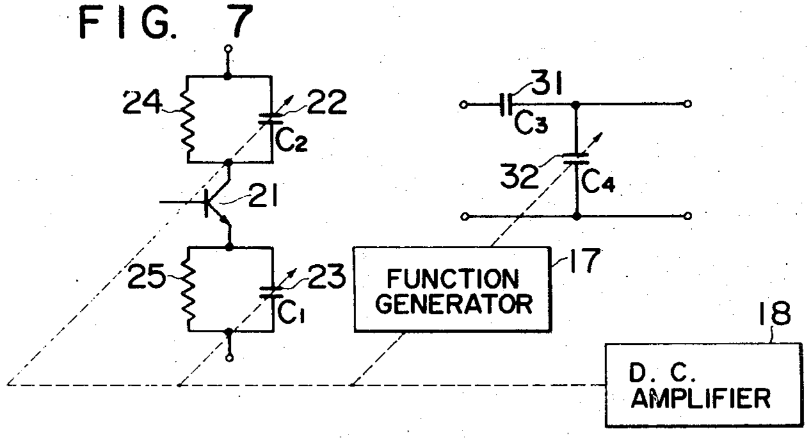
FIGS. 7 and 8 are diagrams each illustrating in detail one example of a portion of the circuit of FIG. 6.

This is equal to $(l_2/l_1)^2 f$ and $\sqrt{l_2/l_1 f}$ converted from the frequency *f* of the characteristic of the variable equalizer 13 with respect to the line length $l_1$. This can be realized by approximating a required characteristic for the line length $l_1$ in a rational function and changing the pole zero frequency corresponding to the transmission line length. The circuit construction therefor is a multistage connection of such a basic circuit as shown in FIG. 7 in which a parallel circuit of a variable capacitor ($C_2$)22 and a resistor 24 and a parallel circuit of a variable capacitor ($C_1$)23 and a resistor 25 are connected to collector and emitter circuits of a transistor 21 respectively. For example, in the case of a transmission line using a 9.5/2.6mm (outer diameter/inner diameter) standard coaxial cable 1.6Km long and with $f_0 =$ 400MHz, three or four stages of the basic circuit are required. The variable equalizing characteristic of the variable equalizer 13 can be obtained by using a variable capacitance diode so that the variable capacitors $(C_2)$22 and $(C_1)$23 of the aforementioned parallel circuits may have a variable characteristic proportional to the square ratio and the square root ratio of the transmission line length to a control voltage.

The variable attenuator 14 is formed with a circuit such as depicted in FIG. 7 which comprises a fixed capacitor 31 directly connected to an input terminal and a variable capacitor 32 connected in parallel therewith. The capacitance of the fixed capacitor 31 is selected larger than that of the variable capacitor 32 to obtain a variable attenuation characteristic that an output open-circuit voltage transfer ratio becomes flat.

Figure 8:
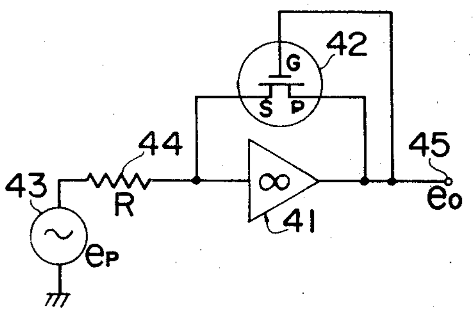

The function generator 17, which supplies the aforementioned variable capacitor 32 with an output proportional to the square root of an input, is of such a construction as shown in FIG. 8 in which, for example, a field effect transistor 42 is connected in parallel with a feedback amplifier 41 feeding its output back to the gate of the field effect transistor 42. In the case of applying a voltage *ep* from source 43 to the feedback amplifier 41 through a series resistor (R) 44, an output voltage $e_o$ applied to terminal 45 is given in the following form:

$$e_o = \sqrt{e_p/KR}$$

where $K$ is a constant. Thus, the aforementioned required variable characteristic is obtained.

Figure 9:
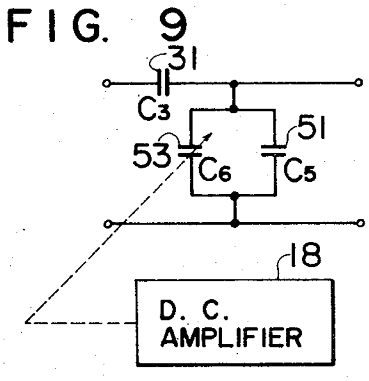
FIG. 9 is a diagram showing in detail one example of a portion of another example of this invention.

The function generator 17 can be left out by approximately simplifying the value $\tau$ related to the pulse width of the received Gaussian waveform determined by equation 6. Namely, $\tau$ is approximated to the following linear equation.

$$\tau = Dl + E \qquad (10)$$

where D and E are constants which are selected so that the frequency bands of the characteristic $EQ_1(f)$ and $EQ_2(f)$ for maximum and minimum transmission line lengths may be the same. For example, the constants D and E are selected by determining $\tau$ such that the frequency bands of the characteristic $EQ_1(f)$ and $EQ_2(f)$ corresponding to the maximum and minimum transmission line lengths may be the same and by approximating the frequency band corresponding to a line length intermediate between the maximum and minimum line lengths by connecting the frequency bands of the maximum and minimum line lengths with a straight line. In this case, the function generator 17 of FIG. 7 is left out and as depicted in FIG. 9, it is possible to realize an approximate variable characteristic with a simple construction by replacing the variable capacitor $(C_4)$32 with a parallel circuit of a fixed capacitor $(C_5)$51 and a variable capacitor $(C_6)$53 and directly controlling the variable capacitor 52 with the output from the amplifier 18.

It will be apparent that many modifications and variations may be effected without departing from the scope of the novel concepts of this invention.

What is claimed is:

1. A waveform equalizer system for pulse repeating transmission, said waveform equalizer system comprising:

a. a transmission line, and b. a repeater inserted within said transmission line, said repeater comprising:

1. a variable equalizer for providing an output,
2. a variable attenuator coupled to said equalizer and controlled by the output of a function generator means for maintaining a maximum amplitude of the received signal at a substantially constant value,
3. a rectifying circuit coupled in a feedback arrangement and responsive to the repeater output for providing a signal proportional to the transmission line length and for altering the pulse width of a received signal from said tranmission line within an allowable value restricted by waveform interference, the proportional signal being applied to said variable equalizer for the control thereof, and
4. said proportional signal also being applied to said function generator means for converting the proportional signal as derived from said rectifying circuit, by a function associated with the transmission line length.

2. A waveform equalizer system according to claim 1, wherein said function generator means comprises a variable attenuator driven by the function which is proportional to the square root of the transmission line length.

3. A waveform equalizer system according to claim 2, wherein said variable attenuator comprises a circuit including a capacitor variable as a function proportional to the square root of the transmission line length.

4. A waveform equalizer system according to claim 1, wherein said function generator means comprises a variable attenuator driven by the function which has a linear relation to the transmission line length.

5. A waveform equalizer system according to claim 4, wherein said variable attenuator comprises a circuit including a capacitor variable as a function proportional to said transmission line length.

6. A waveform equalizer system according to claim 1, wherein said equalizer includes a circuit including a capacitor variable with respect to said transmission line length.

7. A waveform equalizer system according to claim 1, wherein said function generator means generates the function related to said transmission line length for providing a driving signal to a variable attenuator.

* * * * *